(No Model.)

J. N. WOODRUFF.
OYSTER DREDGE.

No. 284,156. Patented Aug. 28, 1883.

WITNESSES:

INVENTOR:
J. N. Woodruff
BY Munn & Co
ATTORNEYS.

United States Patent Office.

JOHN N. WOODRUFF, OF FAIRTON, NEW JERSEY.

OYSTER-DREDGE.

SPECIFICATION forming part of Letters Patent No. 284,156, dated August 28, 1883.

Application filed June 28, 1883. (No model.)

*To all whom it may concern:*

Be it known that I, JOHN N. WOODRUFF, of Fairton, in the county of Cumberland and State of New Jersey, have invented a new and Improved Oyster-Dredge, of which the following is a full, clear, and exact description.

The object of my invention is to provide a simple, effective, and durable machine for recovering oysters and other shell-fish from the beds of rivers, bays, or streams.

The invention consists in an oyster-dredge formed or constructed with a continuous shoe or runner ranging along the rake head or bar, to which the rake-teeth are fastened, the runner being arranged to lie obliquely with its forward edge about in line with the point of projection of the teeth from the rake head or bar, so that the teeth may enter the river-bottom freely their entire projecting length, while the runner acts to prevent a further sinking of the dredge into the soft bottom, and also smooths the bottom or bed and clears it of injurious accumulations of soft mud, and leaves the bottom in better condition for the subsequent planting and growth of the shell-fish. The rake-head is fitted with a trailing basket, to receive the oysters removed from the bottom by the rake-teeth, all as hereinafter fully described and claimed.

Reference is to be had to the accompanying drawings, forming part of this specification, in which similar letters of reference indicate corresponding parts in all the figures.

Figure 1:
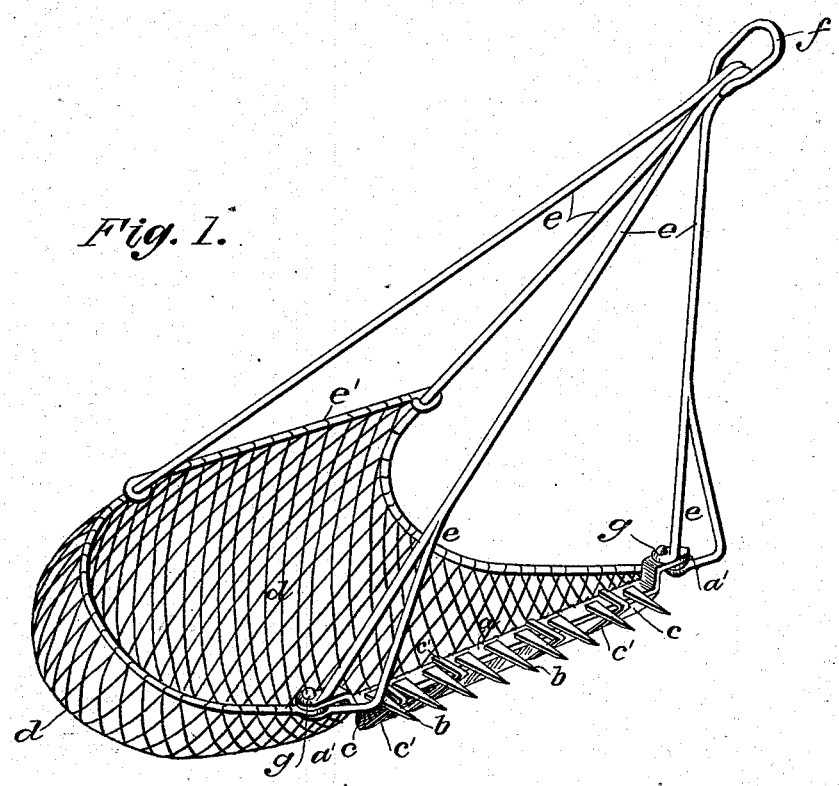
Figure 2:
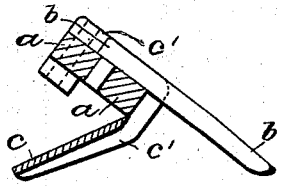
Figure 3:
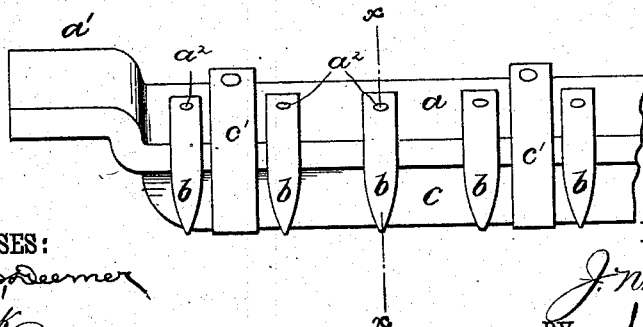

Figure 1 represents my improved dredge tilted back somewhat from the position of use, to better show the construction of the rake-head. Fig. 2 is an enlarged cross-sectional elevation of the rake-head on line $x\ x$ of Fig. 3, and Fig. 3 is a front view of a portion of the rake-head to the scale of Fig. 2.

I construct the rake-head of the dredge of a cross-bar, $a$, preferably bent upward at the ends, as at $a'$, and having formed or fixed to it, by bolts or rivets $a^2$, or otherwise, the teeth $b$, which project a suitable distance below bar $a$, for working the required depth in the river-bed for digging the shell-fish therefrom. Back of the bar $a$, and about in line with its lower edge, I secure strongly, by angle-plates $c'$, the shoe or runner $c$, the angle-plates in this instance being fastened to bar $a$ and runner $c$ on their forward or outside faces; but the angle-plates may be fastened to the back or inner faces of the bar and runner, if desired. As represented clearly in Fig. 2, the runner $c$ will lie about flat on the river-bed while the teeth $b$ will assume an angle of about forty or forty-five degrees with the runner and river-bed, for entering the bed easily to loosen and lift the shell-fish, which pass over the back of the rake into the netting basket $d$, which may be of any suitable mesh and have any suitable frame of side bars, $e$, which are bunched together at the forward end, where any approved clevis, $f$, is secured, to which clevis the draft rope or chain leading from a boat is fastened to draw the dredge forward over the bottom. The edges of the netting of basket $d$ may connect by rings or otherwise with the rake-bar $a$ and the side bars, $e$, and upper rear cross-bar, $e'$, of the frame.

To secure the rake-head to the frame in a substantial manner its ends $a'$ are bolted between the bars $e$ of the frame, as at $g$.

If desired, the forward edge of runner $c$ may be set back a little from the lower edge of bar $a$, so that the loosened mud of the bottom may have a better chance of escape directly behind the teeth to avoid clogging of the dredge; but the close joint of the bar $a$ and runner $c$, as shown, is at present preferred.

In operation the dredge is drawn over the bottom on which the runner $c$ rests, while the projecting teeth $b$ enter the bottom and remove the oysters, which pass over into basket $d$, the dredge being hauled up at intervals for discharge of the shell-fish, as required.

The number, size, and shape of teeth $b$ may vary with the special work to be done, and the machine may be built of any desired size suitable to be worked by the available power, as by hand, or by row-boats, or steam-vessels.

It will be noted that by arranging the forward edge of the runner $c$ about in line with the roots or bases of the projecting teeth $b$, the sinking of the machine in the soft mud of the bottom is practically limited to that point, and, furthermore, after the teeth have passed over the bottom and reclaimed all the shell-fish, the runner $c$ acts to settle and smooth the bottom, as would a roller, thereby better fitting the river-bed to receive a new plant of shell-fish, and better promoting their healthful growth.

I do not abandon or dedicate to the public any patentable feature set forth herein and not hereinafter claimed, but reserve the right to claim the same either in a reissue of any patent that may be granted upon this application, or in other applications for Letters Patent that I may make.

Having thus described my invention, what I claim as new, and desire to secure by Letters Patent, is—

1. In a dredge, a rake-head constructed with cross-bar $a$, teeth $b$, secured to and projecting from the cross-bar, and a shoe or runner, $c$, fitted obliquely with its forward edge about in line with the roots of the teeth $b$, or the point where the teeth overhang or project from the bar $a$, substantially as shown and described.

2. The combination, with the rake $a\,b\,c$, constructed and operating as herein specified, of the draft-frame $e\,e'\,f$ and the trailing basket $d$, substantially as shown and described.

JOHN N. WOODRUFF.

Witnesses:
JAMES W. TRENCHARD,
JOHN S. MITCHELL.